(12) United States Patent
Pham

(10) Patent No.: US 9,596,213 B2
(45) Date of Patent: Mar. 14, 2017

(54) MONITORING ARRANGEMENT

(71) Applicant: Eco Hive Limited, London (GB)

(72) Inventor: Philippe Pham, London (GB)

(73) Assignee: Eco Hive Limited, London (GB)

( * ) Notice: Subject to any disclaimer, the term of this patent is extended or adjusted under 35 U.S.C. 154(b) by 192 days.

(21) Appl. No.: 14/473,161

(22) Filed: Aug. 29, 2014

(65) Prior Publication Data

US 2015/0081888 A1     Mar. 19, 2015

(30) Foreign Application Priority Data

Aug. 30, 2013   (GB) .................................. 1315454.7

(51) Int. Cl.
*G06F 15/173*  (2006.01)
*H04L 29/06*   (2006.01)
*H04L 12/26*   (2006.01)
*H04L 29/08*   (2006.01)

(52) U.S. Cl.
CPC ...... *H04L 63/0236* (2013.01); *H04L 43/0811* (2013.01); *H04L 67/28* (2013.01)

(58) Field of Classification Search
CPC . H04L 63/0236; H04L 43/0811; H04L 67/28; H04L 63/00; H04L 43/00
See application file for complete search history.

(56) References Cited

U.S. PATENT DOCUMENTS

| 9,148,354 B2 * | 9/2015 | Johnsson ............ H04L 41/5038 |
| 2005/0191997 A1 * | 9/2005 | Spearman ............. H04L 12/585 455/418 |
| 2005/0193429 A1 | 9/2005 | Demopoulos et al. |
| 2005/0235352 A1 | 10/2005 | Staats et al. |
| 2007/0066297 A1 | 3/2007 | Heidari-Bateni |
| 2007/0199060 A1 * | 8/2007 | Touboul ................ G06F 21/562 726/11 |
| 2009/0248702 A1 | 10/2009 | Schwartz et al. |
| 2014/0331321 A1 * | 11/2014 | Witherspoon ...... H04L 63/0227 726/23 |

OTHER PUBLICATIONS

TalkTechToMe, downloaded Jun. 3, 2014 from: www.gfi.com/blog/the-top-20-free-network-monitoring-and-analysis-tools-for-sysadmins/.

(Continued)

*Primary Examiner* — Krisna Lim
(74) *Attorney, Agent, or Firm* — The Webb Law Firm

(57) ABSTRACT

A monitoring arrangement (1) for use with a computer network. The arrangement (1) comprises a filtering module (7) which is operable to filter content delivered to a device connected to the network and to generate filtering data indicative of content filtered by the filtering module (7). The arrangement (1) further comprises a connectivity detection module (6) which is operable to detect the connectivity of a device connected to the network and to generate connectivity data indicative of the connectivity of the device. The arrangement (1) is operable to detect when a new device is connected to the computer network and to examine the new device to determine whether the new device is a trusted device. If the new device is not a trusted device then the monitoring arrangement (1) alerts a user to the attempted access by the untrusted device. The monitoring arrangement (1) is also operable to improve the performance of the computer network.

26 Claims, 6 Drawing Sheets

(56) References Cited

OTHER PUBLICATIONS

Wifi traffic monitoring software social advice, downloaded Jun. 3, 2014 from: softadvice.informer.com/Wifi Traffic_Monitoring_Software.html.

Comm View for WiFi, downloaded Jun. 3, 2014 from: www.tamos.com/products/commwifi/.

Who's On My Wifi, downloaded Jun. 3, 2014 from: www.whoisonmywifi.com/.

Packet Spy, downloaded Jun. 3, 2014 from: packetspy.software.informer.com/.

Yang, Jeonghwa, et al., "Eden: Supporting Home Network Management Through Interactive Visual Tools", Proceedings of the 23rd Annual ACM Symposium on User Interface Software and Technology, UIST '10, Aug. 6, 2010, pp. 109-118, New York, New York, US.

"Cisco Routers: Newest Versions of Cisco Network Magic Simplify Management of Home Networks", May 12, 2009, http://newsroom.cisco.com/dlls/2009/prod_051209.html.

\* cited by examiner

MONITORING ARRANGEMENT

CROSS-REFERENCE TO RELATED APPLICATION

This application claims priority to United Kingdom Patent Application No. 1315454.7 filed Aug. 30, 2013, the disclosure of which is hereby incorporated in its entirety by reference.

FIELD OF THE INVENTION

The present invention relates to a monitoring arrangement and more particularly relates to a monitoring arrangement for use with a computer network.

BACKGROUND OF THE INVENTION

The Internet is now an important component in our modern lifestyle. It is common for a user to run a computer network in their home to connect devices to one another and to the Internet. In most cases, a home user will use a Wifi (wireless) connection to connect devices within their home or garden.

Modern technology has evolved to make it easy for a home user who is not experienced in information technology (IT) to set up a computer network within their home. Devices are usually designed to be "plug and play" such that a device is ready to operate as soon as it is plugged in and powered up. This makes it relatively easy for a home user to set up a computer network.

The downside to plug and play devices is that a plug and play device will usually connect the device to a network using default settings which may not be optimal. A home user might not have the necessary technical knowledge or inclination to optimise the configuration of a device.

A home computer network which is set up by a user with the default plug and play device settings may have a relatively low level of security. The network might therefore be vulnerable to attack by a malicious party. In the case of a Wifi connection, a malicious party can relatively easily hack into a Wifi network by circumventing the default Wifi encryption, if indeed encryption is being used at all. A malicious party can therefore connect to a user's Wifi connection without their knowledge and access the network and the Internet. The malicious party could then launch a hacking attack elsewhere on the Internet via the home user's Internet connection. When the hacking attack is examined, the IP address used in the attack will be traced back to the unsuspecting home user and not to the malicious party.

A further problem for home Internet users is that malware, viruses, trojans and phishing attacks are common. Viruses and malware are relatively successful in infecting computers, especially with the rise in use of social networks.

A home computer user can also face significant problems if their home computer network stops functioning. It can be difficult for a home user with no technical knowledge to troubleshoot network connectivity issues.

The present invention seeks to provide an improved monitoring arrangement for use with a computer network.

SUMMARY OF THE INVENTION

According to one aspect of the present invention, there is provided a monitoring arrangement for use with a computer network, the arrangement comprising a filtering module operable to filter content delivered to a device connected to the network and to generate filtering data indicative of content filtered by the filtering module a connectivity detection module operable to detect the connectivity of a device connected to the network and to generate connectivity data indicative of the connectivity of the device; and an event recording module operable to store a record of the data generated by the respective modules, the record of data providing a history of events detected by the monitoring arrangement.

Preferably, the components of the arrangement are integrated into a stand-alone device.

Conveniently, the arrangement comprises a wired network interface to connect the arrangement to a computer network.

Advantageously, the arrangement comprises a wireless network interface to connect the arrangement to the computer network.

Preferably, the connectivity module further comprises a wireless connection scanning module operable to scan and monitor a wireless connection of a device connected to the computer network.

Conveniently, the wireless connection scanning module is operable to scan a plurality of wireless communication channels and to detect the wireless channel which provides optimum communication between devices connected to the computer network.

Advantageously, the arrangement is operable to instruct a router connected to the computer network to communicate with other devices connected to the network using the selected optimum channel.

Preferably, the connectivity module further comprises a wired connection scanning module operable to detect and monitor devices connected to the computer network by a wired connection.

Conveniently, the monitoring arrangement further comprises an Internet connection monitoring module operable to monitor the connection between the computer network and the Internet and to generate Internet connection data indicative of the quality of the connection of the network to the Internet.

Advantageously, the connectivity module further comprises an Internet speed detection module operable to detect the speed of the connection between the computer network and the Internet and to generate Internet speed data indicative of the speed of the connection between the computer network and the Internet.

Preferably, the connectivity module further comprises a dynamic name system (DNS) server monitoring module operable to monitor the ability of devices connected to the computer network to resolve the domain names using the dynamic name system server.

Conveniently, the connectivity module is operable to measure the latency time of the connection of a device connected to the network.

Advantageously, the arrangement further comprises a system resources monitoring module which is operable to monitor at least one system resources of a device connected to the network.

Preferably, the arrangement further comprises a failover gateway module which is operable to switch a connection from the monitoring arrangement from a primary Internet gateway to a secondary Internet gateway in the event that there is a failure in the primary Internet gateway.

Conveniently, the filtering module further comprises a web advertisement filter operable to block web advertisements from being communicated to a device connected to the network.

Advantageously, the filtering module further comprises an antivirus module operable to detect viruses and malware and to block detected viruses and malware before the viruses and malware are delivered to a device connected to the network.

Preferably, the filtering module further comprises a content filter operable to block web content according to at least one predetermined category from being delivered to a device connected to the network.

Preferably, the arrangement comprises a web proxy which is configured for use by at least one of the modules of the arrangement.

In one embodiment, the web proxy comprises a local cache which is operable to store web content to increase the speed at which web content is delivered to a device connected to the network.

Conveniently, the arrangement further comprises a notification module operable to provide a notification to a user in the event that the connectivity detection module detects that a device connected to the network has impaired connectivity.

Advantageously, the notification comprises an instruction to assist a user in resolving a problem with the connection of a device to the computer network.

Preferably, the arrangement is operable to initialise the components of the arrangement automatically without user input.

Conveniently, the monitoring arrangement is a headless system which operates without being attached to a computer monitor.

In one embodiment, the arrangement further comprises a sound generation module operable to generate sounds to notify a user of the state of the arrangement.

In another embodiment, the arrangement further comprises a speech synthesiser module operable to generate speech synthesis to notify a user of the state of the arrangement.

Preferably, the arrangement further comprises a web-control module operable to provide a control interface to a remote device.

Conveniently, the control interface comprises a network map showing the connections between devices connected to the computer network.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION OF THE INVENTION

Figure 1:
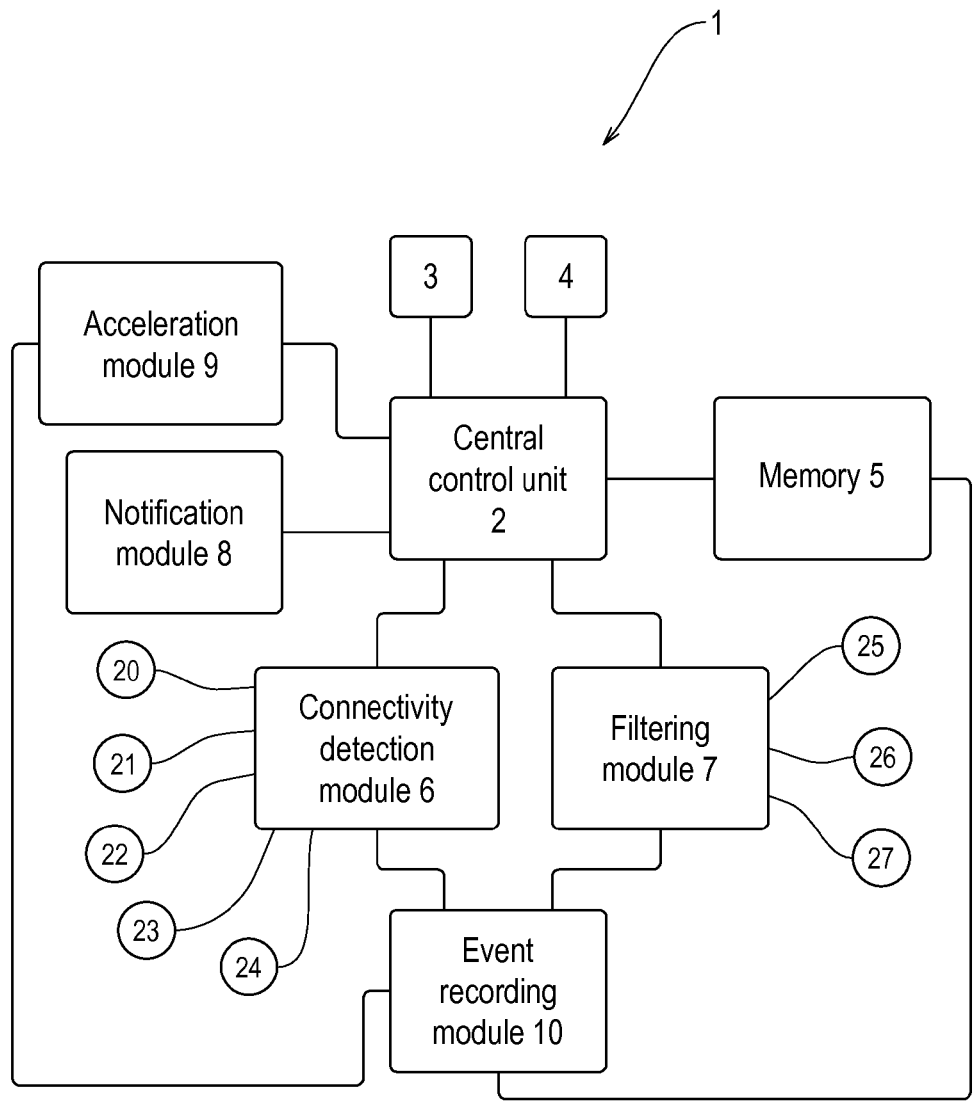
FIG. 1 is a schematic diagram of a monitoring arrangement of an embodiment of the invention.

Referring initially to FIG. 1 of the accompanying drawings, a monitoring arrangement 1 of a preferred embodiment of the invention incorporates a central control unit 2. The central control unit 2 incorporates a processor which is operable to process data from other modules of the arrangement. The other modules are discussed in detail below.

The central control unit 2 is configured to be connected to the Internet. In this embodiment, the arrangement 1 incorporates a wired network interface 3 in the form of an ethernet socket. The arrangement 1 also incorporates a wireless network interface in the form of a Wifi interface 4. In other embodiments, the monitoring arrangement 1 incorporates only one of the wired network interface 3 and the Wifi interface 4.

The central control unit 2 is connected to a memory 5 which is operable to store data to be processed by the central control unit 2 and the modules of the arrangement 1.

The central control unit 2 is connected to a connectivity detection module 6, a filtering module 7, a notification module 8 and an acceleration module 9.

The connectivity detection module 6, the filtering module 7 and the acceleration module 9 are connected to an event recording module 10. The event recording module 10 is connected to the memory 5.

Figure 2:
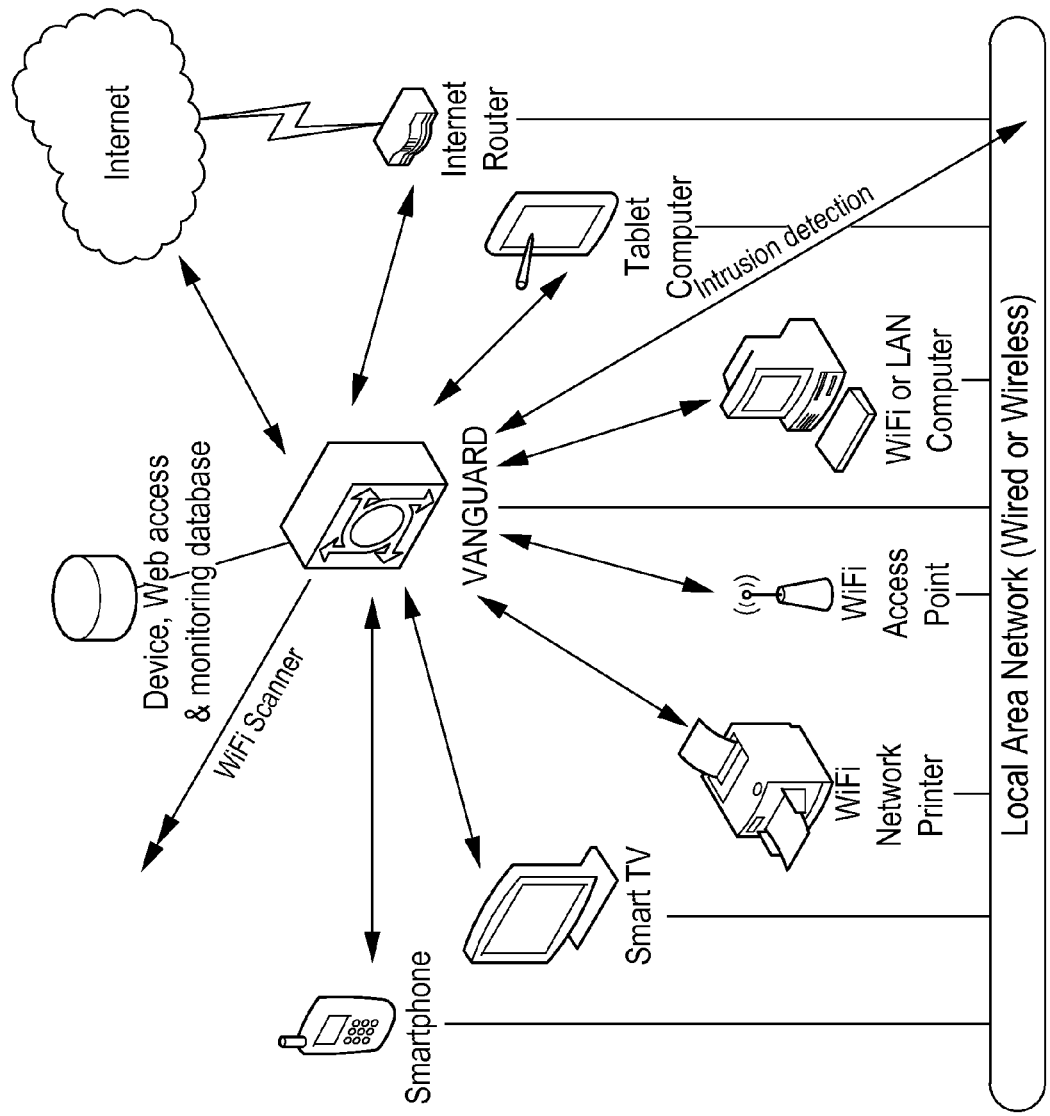
FIG. 2 is a schematic diagram showing devices connected to a monitoring arrangement of an embodiment of the invention.

In this embodiment, all components of the monitoring arrangement 1 are integrated into a single network management device 11, as shown in FIG. 2. The network interfaces 3, 4 enable the network management device 11 to connect to a computer network in the form of a local area network 12.

FIG. 2 shows an example computer network in which devices are connected to the local area network 12 and to the network management device 11. In this example, the devices connected to the computer network comprise a smartphone 13, a smart television 14, a wired network or Wifi printer 15, a Wifi access point 16, a desktop or laptop computer 17, a tablet computer 18 and a network router 19. All of the devices 13-19 are connected to the local area network 12 either by a wired (ethernet) connection or by a wireless (Wifi) connection. It is to be appreciated that other devices may be connected to a computer network for use with network management device 11 besides the devices shown in FIG. 2.

The network management device 11 is, in this embodiment, a stand-alone hardware appliance that can operate as a headless device without a screen being connected directly to a socket on the device 11. In one embodiment, the network management device 11 is a small form factor computer. In the preferred embodiment, the network management device 1 executes a Linux operating system.

The various modules 6-10 of the monitoring arrangement 1 will now be described in detail.

The Connectivity Detection Module

The connectivity detection module 6 incorporates a network scanning module 20 which is operable to scan a computer network to discover devices connected to the computer network. The network scanning module 20 is operable to generate network map data which comprises a record of the devices connected to the computer network and the interconnections between the devices.

In one embodiment, the network scanning module 20 is operable to compare the devices identified in the computer network with a list of authorised or trusted devices and to generate an alert signal if an unauthorised or untrusted device is connected to the network. In one embodiment, the network scanning module 20 detects the media access control address (MAC address) of each device connected to the network.

An embodiment of the invention is operable to store a list of trusted devices in the memory 5. In one embodiment, the network scanning module 20 is operable to detect a new device that was not previously connected to the network. The network scanning module 20 reports the new device as an untrusted device by providing a notification to a user so that the user is aware that a potentially unauthorised device is connected to or is attempting to connect to the network.

An embodiment of the invention is operable to automatically fetch information about a new device, such as the operating system type, MAC address, hostname and other information to enable the device to be checked. In one embodiment, the arrangement examines a new device in detail to establish additional connection information, such as the user login name that was used by the device during the connection. If the user can positively identify the device as a device which should be authorised to connect to the network, the user marks the device as a trusted device using the web management interface which is described in detail below. As such, the functionality of this component of the arrangement is similar to the Identification Friend or Foe (IFF) system which is used in the military world.

In one embodiment, the connectivity detection module 6 comprises an Internet connection monitoring module 21 which is operable to monitor the connection between the computer network and the Internet. The Internet connection monitoring module 21 periodically sends a connection request to an external host to determine if the connection to the Internet is operating normally or if there is a slow connection or no connection at all. The Internet connection monitoring module 21 preferably uses at least two different network protocols, such as http, ntp or icmp to monitor the connection between the network and the Internet. In one embodiment, the Internet connection monitoring module 21 sends a ping request to the network router 19 in the computer network to detect if there is a failure in the router connection.

In one embodiment, the connectivity detection module 6 incorporates an Internet speed detection module 22 which is operable to detect the speed and latency time of the connection between the computer network and the Internet. The Internet speed detection module 22 generates Internet speed data indicative of the speed of the connection between the computer network and the Internet. The Internet speed detection module 22 is configured to operate periodically or on demand in order to log the speed of the Internet connection.

In one embodiment, the connectivity detection module 6 incorporates a dynamic name system (DNS) server monitoring module 23 which is operable to monitor the ability of the devices connected to the computer network to resolve domain names using a remote DNS server. The DNS server monitoring module 23 periodically checks the connection to remote DNS servers and generates an alert signal if domain names can no longer be resolved by remote DNS servers.

In one embodiment, the DNS server monitoring module 23 is operable to periodically simulate a client device and obtain an IP address from the DHCP server in the network. In a home network, the DHCP server is typically integrated into the broadband router of the home network. The DNS server monitoring module 23 receives DHCP options from the DHCP server which specify one or more DNS servers that are to be used for name resolution. The DNS server monitoring module 23 tests the name resolution using each DNS server specified in the DHCP options to check that each DNS server is resolving domain names correctly. If a DNS server is not resolving domain names correctly then the DNS server monitoring module provides an alert signal to notify a user.

In one embodiment, the connectivity detection module 6 incorporates a wireless (Wifi) connection scanning module 24 which is operable to scan and monitor Wifi connections in the computer network. For instance, the Wifi scanning module is operable to scan and monitor a wireless connection of a device connected to the computer network. The Wifi scanning module is operable to scan channels used by the wireless connection to detect how busy each channel is. The Wifi scanning module is operable to detect the least busy channel and to notify a user of the least busy Wifi channel. In one embodiment, the Wifi scanning module 24 is operable to automatically instruct the network router 19 to switch the channel used by the computer network to the least busy channel.

In a further embodiment, the connectivity detection module 6 is operable to detect the quality of the network connection of a device which is connected to the network. The connectivity detection module 6 determines the quality of the connection by detecting the speed at which the connection is capable of downloading data from the device and/or uploading data to the device. In a still further embodiment, the connectivity detection module 6 is operable to measure the latency time (ping) for the connection between a device and the network. The connectivity detection module 6 is operable to measure the data connection speed and the latency time for both wired and wireless connections between devices and the network.

The connectivity detection module 6 is operable to compare a measured latency time with at least one predetermined latency time threshold to determine whether the measured latency time is indicative of a problem within the network, such as a congested, slow or bad wireless or wired connection. For instance, the connectivity detection module 6 is operable to classify a measured latency time which is below a latency time threshold of 0.8 ms as a normal latency time, a measured latency time of between 0.8 ms and 2 ms as a congested wireless or wired connection or a measured latency time of over 2 ms as a slow wireless connection or bad wired connection.

In a further embodiment, the connectivity detection module 6 is configured to detect a higher than normal latency time between a device and the network and to register that the device might potentially be a device which is attempting to gain unauthorised access to the network. The measured latency time which is higher than normal may therefore be used in an intrusion detection scenario where a wireless connection of a device attempting to gain unauthorised access to the network would most likely have a higher than normal latency time.

The connectivity detection module 6 is operable to measure the latency time for a connection to a device in the network periodically, preferably from the first occasion that the device is connected to the network. The history of latency times for devices in the network is stored by the event recording module 10. The monitoring arrangement 1 is operable to analyse the history of stored latency times and to calculate an average latency time for the connection of a device to the network.

In another embodiment, the monitoring arrangement 1 is configured to detect the presence of a device which is configured to block ping (ICMP) requests, for instance by using a firewall. This type of operation is commonly referred to as "stealth mode" since it is usually harder to detect a device that is operating in this mode as compared with a device that does not block ping (ICMP) requests. This embodiment therefore offers improved network monitoring and intrusion detection since it is capable of detecting potentially malicious devices which attempt to connect to the network in a "stealth mode".

In another embodiment, the connectivity detection module is operable to measure the connection latency time between a device within the network and the Internet. In this embodiment, the latency time between a device and the Internet is measured using the Internet speed detection module 22.

In one embodiment, the monitoring arrangement 1 of the preferred embodiment of the invention incorporates a proxy server which is stored in the memory 5 and which is executed by the central control unit 2. The proxy server is integrated in the network monitoring device 11. Devices connected to the computer network communicate with the Internet via the proxy server. In other embodiments, the proxy server is omitted.

The Filtering Module

In one embodiment, the filtering module 7 incorporates a web advertisement filtering module 25 which is operable to detect and block web advertisements before they are delivered to a device which is connected to the network and which is requesting content from the Internet. The web advertisement filter module 25 is configured to detect and block web advertisements in the form of animated images and videos which represent an unwanted consumption of Internet bandwidth and which are generally perceived as a nuisance to Internet users.

In one embodiment, the filtering module 7 incorporates an antivirus module 26 which is operable to detect viruses and malware and to block detected viruses and malware before the viruses and malware are delivered to devices connected to the network. In one embodiment, the antivirus module 26 is a web antivirus module, which is implemented as an add-on to the proxy server. The antivirus module 26 automatically cleans web content before it is delivered to devices in the network to minimise the possibility of the devices being infected with a virus or malware. The antivirus module 26 provides an additional layer of protection above local antivirus software which may be running on a device in the network.

In one embodiment, the filtering module 7 incorporates a content filtering module 27 which is operable to block predetermined web content from being delivered to devices connected to the network. For instance, the content filtering module 27 may be configured to block websites carrying inappropriate content according to predetermined categories.

The Event Recording Module

The event recording module 10 is operable to receive data generated by the other modules of the arrangement 1 and to store a record of the data in the memory 5. The event recording module 10 is operable to store a history of events detected by the monitoring arrangement 1. The stored event history provides information on events detected by the monitoring arrangement 1 which can be used to help resolve connectivity and security issues within the computer network.

The Notification Module

The notification module 8 is operable to communicate with the other modules in the arrangement 1 and to provide a notification to a user in the event that the connectivity detection module 6 detects that a device connected to the network loses or suffers impaired connectivity. In a preferred embodiment, the notification comprises instructions to assist the user in resolving a connectivity problem. The notification is, in one embodiment, in the form of an email which is sent to a user.

In one embodiment, the notification module 8 is operable to notify a user if:

An unauthorised device is connected to the network.
There are connectivity issues, such as a loss or a reduction in the speed of the connection to the Internet.
If there is impaired Wifi performance caused, for instance, by a saturated Wifi channel or Wifi latency.
There are detected web antivirus events, such as the detection of malware or a virus or if web antivirus malware or virus definitions are updated.
If there are other critical system events which require user attention.

The Web Acceleration Module

The web acceleration module 9 is operable to increase the speed at which content is delivered to a device connected to the network as compared with the device requesting the same content repeatedly from the Internet. The web acceleration module 9 incorporates a local cache which is operable to store web content. The web acceleration module 9 serves content stored in the local cache to a device to avoid the content being downloaded repeatedly from the Internet. This is particularly effective with social media websites where several devices connected to the network often wish to view the same content.

The Internet acceleration module 9 is preferably implemented in a local proxy server, which is running as part of the monitoring arrangement 1.

System Resources Monitoring Module

Figure 5:
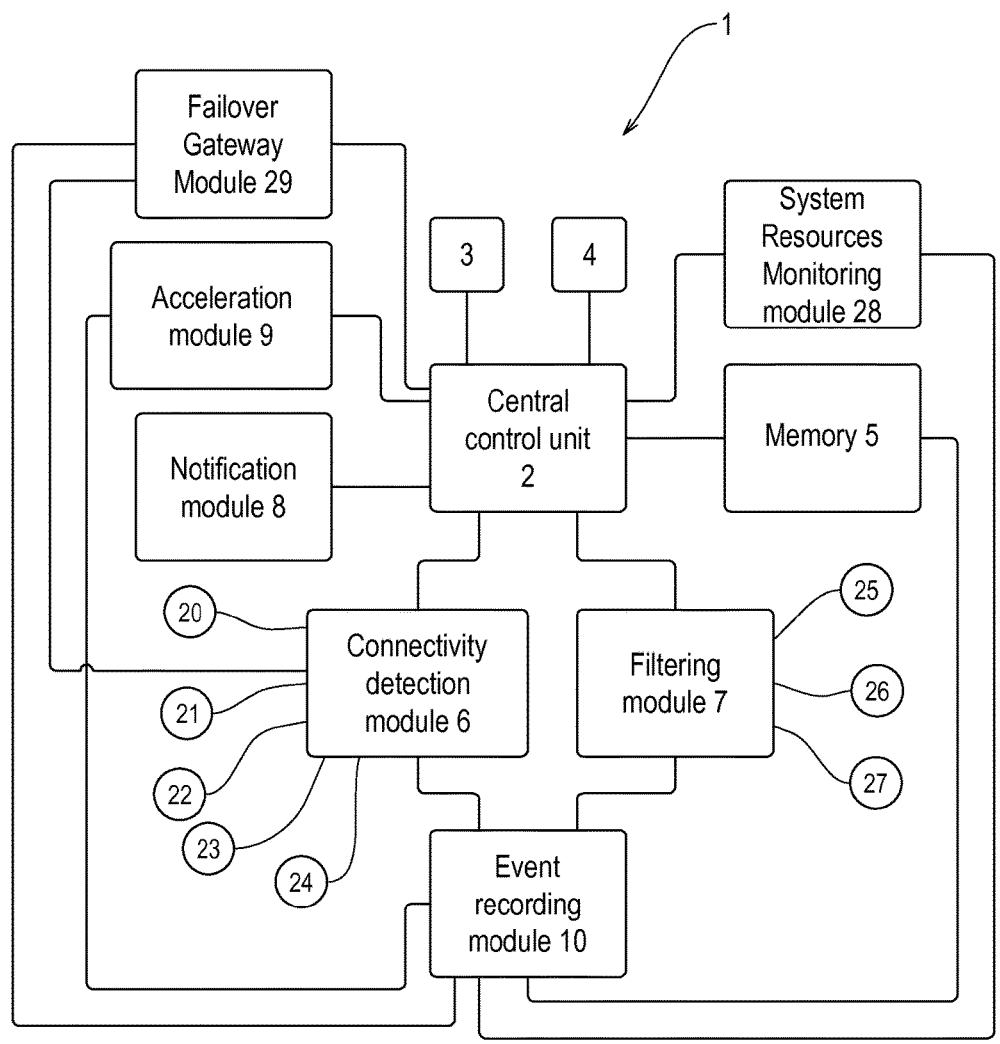
FIG. 5 is a schematic diagram of a monitoring arrangement of a further embodiment of the invention.

Referring now to FIG. 5 of the accompanying drawings, a monitoring arrangement 1 of a further embodiment of the invention incorporates the same components as the monitoring arrangement 1 described above, but with the addition of a system resources monitoring module 28. The system resources monitoring module 28 is connected to the control unit 2 and to the event recording module 10.

The system resources monitoring module 28 is configured to monitor system resources of devices connected to the network. For instance, the system resources monitoring module monitors the disk usage, memory (RAM) usage and CPU usage of devices connected to the network. In one embodiment, the system resources monitoring module operates using the Simple Network Management Protocol (SNMP) which communicates with an SNMP stack which is enabled and configured on a device which is to be monitored within the network.

The system resources monitoring module 28 is operable to monitor the system resources on at least one device connected to the network and to alert a user via the notification module 8 to any issues relating to the system resources of a device within the network.

In one embodiment, the monitoring arrangement 1 is operable to generate an email alert for a user when a system resource threshold is reached, for instance the disk usage of a device is above a predetermined threshold.

Failover Gateway Module

Referring again to FIG. 5, the monitoring arrangement 1 of a further embodiment of the invention incorporates a failover gateway module 29 which is connected to the central control unit 2, the connectivity detection module 6 and the event recording module 10.

The failover gateway module 29 enables the monitoring arrangement 1 to operate with multiple redundant Internet gateways. Each Internet gateway may be provided by a separate Internet connection which provides a back-up Internet connection in the event that the primary Internet connection fails. In this embodiment, each client device within the network is configured with a default gateway pointing to the monitoring arrangement 1. The failover gateway module effectively acts as a routing engine which routes Internet traffic between a device within the network and the Internet via either the primary Internet gateway or a redundant Internet gateway in the event that there is a failure in the primary Internet gateway.

The failover gateway module 29 enables the network connection to a device within the network to be switched to a working Internet gateway in the event that the primary Internet gateway fails. The switchover is seamless and there is no requirement for the device to be re-configured. This avoids the need to change the proxy server address on the device.

The monitoring arrangement 1 is operable to monitor the primary Internet gateway and to switch to a second Internet gateway in the event that there is a failure in the primary Internet gateway. The monitoring arrangement 1 is operable to check the DNS resolution for specific predetermined DNS servers for each Internet connection and to switch the Internet gateway to a working Internet gateway if the currently selected Internet gateway is not functioning or if the DNS resolution is not functioning.

The monitoring arrangement 1 is configured to adapt the DNS configuration for the connection between a device within the network and the Internet in the event that the monitoring arrangement 1 switches from a primary Internet gateway to a secondary Internet gateway. This enables the device to access the correct DNS servers for the secondary Internet gateway.

Startup Sequence

The monitoring arrangement 1 is configured to power up as simply as possible because the arrangement is designed to operate without being connected directly to a screen. The arrangement 1 incorporates a sound generator, such as a loudspeaker which produces a sound output to signal the state of the arrangement to a user. The arrangement 1 preferably incorporates a speech synthesis module which is configured to provide a synthesised speech output via the loudspeaker to indicate the status of the arrangement 1. The sound output is used during the power up sequence which involves various components of the arrangement being automatically loaded for execution.

Figure 3:
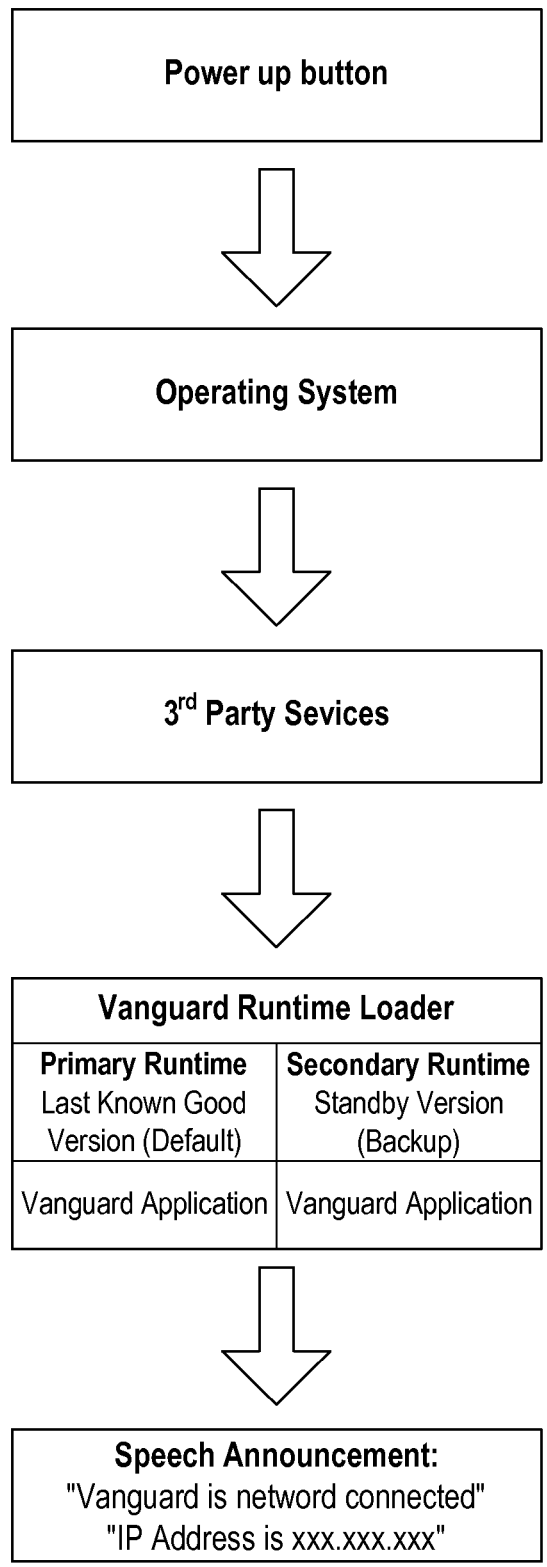
FIG. 3 is a flow diagram showing the start up sequence of an embodiment of the invention.

Referring to FIG. 3 of the accompanying drawings, the power up sequence is initiated by a user pressing a power button on the chassis of the device. An operating system is then loaded for execution by the arrangement and the loudspeaker outputs an audible tone. Next, the individual modules 6-10 of the arrangement 1 are loaded for execution and a further audible tone is output by the loudspeaker. The runtime loader of the central control module of the arrangement 1 is then initialised and loaded and the loudspeaker produces a further audible tone. Finally, the loudspeaker preferably outputs a digitised speech status announcement to inform a user about the connection status on the network and the IP address that is in use. A user can monitor the audible tones produced by the arrangement to identify a failure in the power up sequence.

In a further embodiment, the monitoring arrangement 1 is configured to be connected directly to a screen and to output detailed information to a user via the screen.

In the preferred embodiment of the invention, the monitoring arrangement 1 incorporates a runtime loader which stores a primary runtime version of the application which is the last known working version of the application. The runtime loader also stores a secondary runtime version of the application which is a back up of a known working version. Initially, the two versions of the application are identical. However, when an application update is received, the application version in the secondary run time memory is overwritten with the updated application and the runtime loader is reconfigured to launch the standby runtime application the next time the system is started.

Figure 4:
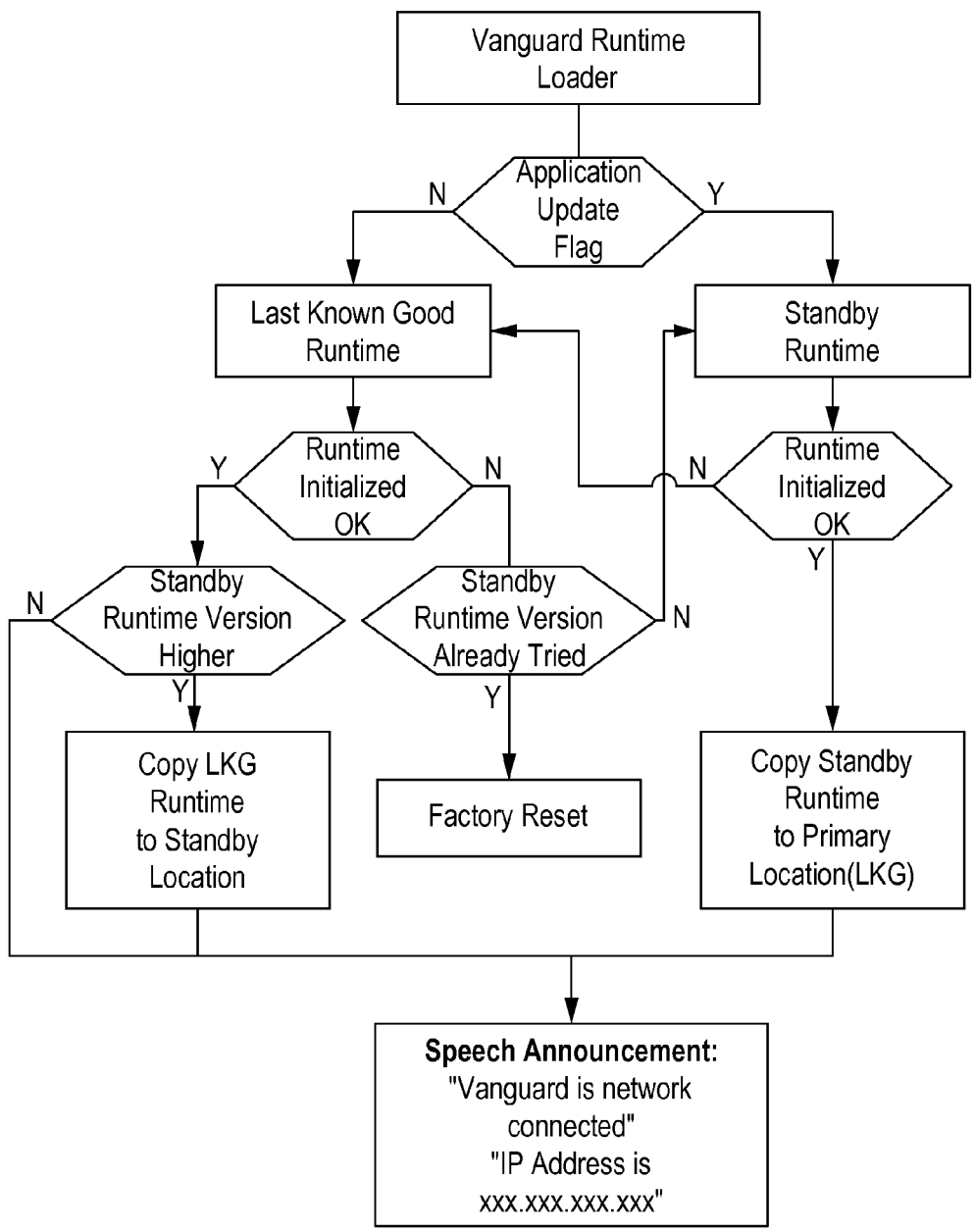
FIG. 4 is a flow diagram showing the start up process of an embodiment of the invention.

Referring now to FIG. 4 of the accompanying drawings, the loading sequence is operable to load the last known good version of the application which is the version that previously loaded successfully. If neither the primary application nor the secondary application are usable, the system applies a factory reset to a known working state.

Web Interface

Embodiments of the invention are operable to transmit a web interface to a remote device. An example screenshot of the web interface is shown in FIG. 5.

The web interface is designed to be easy to use and to provide a clear summary of all aspects of the computer network.

The web interface incorporates interactive elements which may be activated by a user to control the monitoring arrangement 1.

Figure 6:
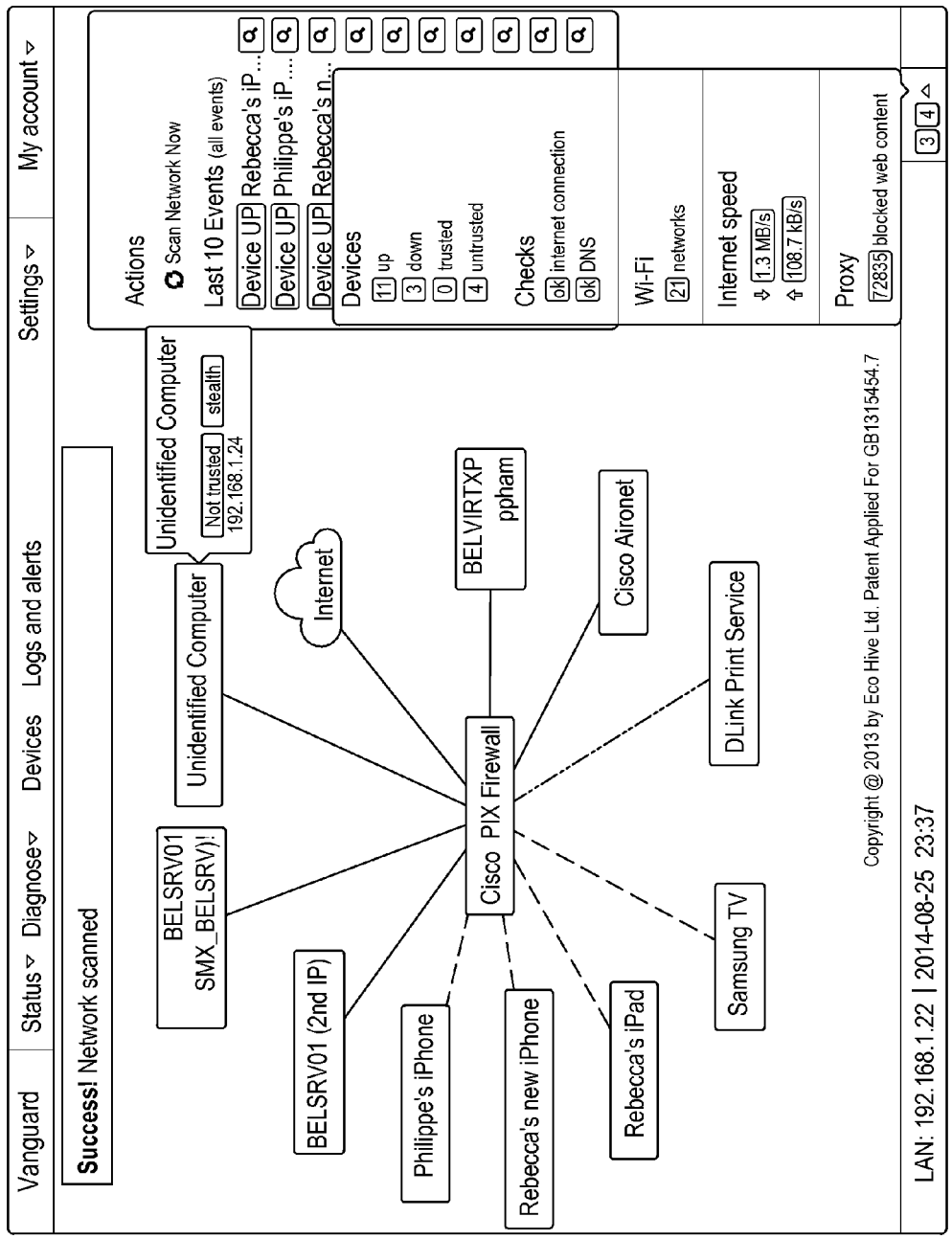
FIG. 6 is a screenshot of a control screen for use with an embodiment of the invention.

The web interface is operable to display important information such as:

The status of the connectivity of devices within the network
The IP addresses of the devices
The most recent status update
The Internet connection speed
The type of each device connected to the network
The quality of the connection of a device to the network
The latency time of a connection of a device to the network
Any detected malware or viruses
Blocked web advertisements
The proxy cache hit rate
Any content filtering violations
The current date and time
A warning indicator of any foreseeable problems
An overall information indicator In one embodiment, the web interface is configured to provide a network map, as shown in FIG. 6 which indicates connections between devices within the network as lines within the network map. In this embodiment, the colour of the lines indicating the connections is preferably adjusted to provide a visual indication of the quality of the connection. For instance, in one embodiment, the lines indicating the connection of a device is shown in blue for a normal latency time for the connection, yellow for a latency time indicating a congested wireless or Wifi connection or red to indicate a high latency time for a slow or bad wireless or wired connection.

In one embodiment, the monitoring arrangement 1 is configured to enable the network map of the web interface to be configured by a user. For instance, the monitoring arrangement 1 is configured to enable a user to specify the thresholds of latency times for connections to devices within the network.

In one embodiment, the web interface provides a list of devices which are connected to the network with the devices grouped by their type. A user is able to view information about each device, such as the devices average latency time, by selecting the device on the web interface.

In embodiments which are configured to detect devices that are operating in "stealth mode", the monitoring arrangement 1 is configured to label the device as a "stealth mode" device on the web interface.

The web interface is designed to provide a summary of all aspects of the computer network that are monitored by the monitoring arrangement 1. The web interface is designed to be used easily by a home user who may have limited IT knowledge.

In embodiments which incorporate the system resources monitoring module 28 as described above, the monitoring arrangement 1 is operable to provide information about the system resources of a device connected within the network via the web interface. In this embodiment, the monitoring arrangement 1 is operable to display the system resources for a device within the network on a graph over a predetermined time period.

In one embodiment, a third party at a remote location may be granted secure access to the web interface. The computer network can therefore be monitored and controlled remotely by a third party.

System Benefits

A monitoring arrangement of an embodiment of the invention functions as a "network truster" device that enables a home user to monitor and manage their home computer network with ease. The monitoring arrangement 1 also secured and improves the performance of the computer network.

The monitoring arrangement 1 is preferably integrated into a single monitoring device 11 which can be connected to a home computer network without the need for extensive technical configuration. The monitoring arrangement 1 provides all required technical functions to maintain and optimise a computer network.

When used in this specification and the claims, the term "comprises" and "comprising" and variations thereof mean that specified features, steps or integers and included. The terms are not to be interpreted to exclude the presence of other features, steps or compounds.

The invention claimed is:

1. A monitoring device for use with a computer network, the device comprising:
   a central control unit comprising a processor and memory, the memory operable to store data to be processed by modules of the device;
   a filtering module operable to filter content delivered to a device connected to the network and to generate filtering data indicative of content filtered by the filtering module;
   a connectivity detection module operable to detect the connectivity of a device connected to the network and to generate connectivity data indicative of the connectivity of the device; and
   an event recording module operable to store a record of the data generated by the respective modules, the record of data providing a history of events detected by the monitoring device;
   wherein the device examines a new connecting device in detail to establish additional connection information to identify to a user that the connecting device is authorized to connect to the network as a trusted device.

2. The monitoring device of claim 1, wherein the components of the device are integrated into a stand-alone device.

3. The monitoring device of claim 1, wherein the device comprises a wired network interface to connect the device to a computer network.

4. The monitoring device of claim 1, wherein the device comprises a wireless network interface to connect the device to the computer network.

5. The monitoring device of claim 4, wherein the connectivity module further comprises:
   a wireless connection scanning module operable to scan and monitor a wireless connection of a device connected to the computer network.

6. The monitoring device of claim 5, wherein the wireless connection scanning module is operable to scan a plurality of wireless communication channels and to detect the wireless channel which provides optimum communication between devices connected to the computer network.

7. The monitoring device of claim 6, wherein the device is operable to instruct a router connected to the computer network to communicate with other devices connected to the network using the selected optimum channel.

8. The monitoring device of claim 3, wherein the connectivity module further comprises:
   a wired connection scanning module operable to detect and monitor devices connected to the computer network by a wired connection.

9. The monitoring device of claim 1, wherein the monitoring device further comprises:
   an Internet connection monitoring module operable to monitor the connection between the computer network and the Internet and to generate Internet connection data indicative of the quality of the connection of the network to the Internet.

10. The monitoring device of claim 1, wherein the connectivity module further comprises:
    an Internet speed detection module operable to detect the speed of the connection between the computer network and the Internet and to generate Internet speed data indicative of the speed of the connection between the computer network and the Internet.

11. The monitoring device of claim 1, wherein the connectivity module further comprises:
    a dynamic name system (DNS) server monitoring module operable to monitor the ability of devices connected to the computer network to resolve the domain names using the dynamic name system server.

12. The monitoring device of claim 1, wherein the connectivity module is operable to measure the latency time of the connection of a device connected to the network.

13. The monitoring device of claim 1, wherein the device further comprises:
    a system resources monitoring module which is operable to monitor at least one system resources of a device connected to the network.

14. The monitoring device of claim 1, wherein the device further comprises:
    a failover gateway module which is operable to switch a connection from the monitoring device from a primary Internet gateway to a secondary Internet gateway in the event that there is a failure in the primary Internet gateway.

15. The monitoring device of claim 1, wherein the filtering module further comprises:
    a web advertisement filter operable to block web advertisements from being communicated to a device connected to the network.

16. The monitoring device of claim 1, wherein the filtering module further comprises:
    an antivirus module operable to detect viruses and malware and to block detected viruses and malware before the viruses and malware are delivered to a device connected to the network.

17. The monitoring device of claim 1, wherein the filtering module further comprises:

a content filter operable to block web content of at least one predetermined category from being delivered to a device connected to the network.

18. The monitoring device of claim 1, wherein the device comprises a web proxy which is configured for use by at least one of the modules of the device.

19. The monitoring device of claim 18, wherein the web proxy comprises a local cache which is operable to store web content to increase the speed at which web content is delivered to a device connected to the network.

20. The monitoring device of claim 1, wherein the device further comprises:
a notification module operable to provide a notification to a user in the event that the connectivity detection module detects that a device connected to the network has impaired connectivity.

21. The monitoring device of claim 20, wherein the notification comprises an instruction to assist a user in resolving a problem with the connection of a device to the computer network.

22. The monitoring device of claim 1, wherein the device is operable to initialise the components of the device automatically without user input, by loading a runtime version of the application previously stored.

23. The monitoring device of claim 1, wherein the monitoring device is a headless system which operates without being attached to a computer monitor.

24. The monitoring device of claim 1, wherein the device further comprises:
a speech synthesiser module operable to generate speech synthesis to notify a user of the state of the device.

25. The monitoring device of claim 1, wherein the device further comprises:
a web-control module operable to provide a control interface to a remote device.

26. The monitoring device of claim 25, wherein the control interface comprises a network map showing the connections between devices connected to the computer network.

* * * * *